US006223225B1

(12) United States Patent
Bisdikian et al.

(10) Patent No.: US 6,223,225 B1
(45) Date of Patent: *Apr. 24, 2001

(54) DYNAMICALLY ADJUSTABLE HYBRID TWO-WAY DATA NETWORKS

(75) Inventors: Chatschik Bisdikian, Mt. Kisco; Kiyoshi Maruyama, Chappaqua, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,840

(22) Filed: Nov. 26, 1997

(51) Int. Cl.[7] ....................................................... G06F 13/00
(52) U.S. Cl. .............................. 709/237; 709/239; 348/7; 348/12; 348/13; 348/10; 348/8; 370/228; 370/261; 370/251; 340/827; 714/4; 714/5; 714/7
(58) Field of Search ................................... 348/7, 12, 10, 348/8, 13; 709/239, 235, 237; 370/251, 228, 261; 714/4, 5; 455/4.2, 5.1; 340/827

(56) References Cited

U.S. PATENT DOCUMENTS

| 5,210,740 | * | 5/1993 | Anzai et al. | 370/251 |
| 5,534,913 | * | 7/1996 | Majeti et al. | 348/12 |
| 5,675,732 | * | 10/1997 | Majeti et al. | 709/20 |
| 5,859,959 | * | 1/1999 | Kimball et al. | 714/4 |

OTHER PUBLICATIONS de Jong, et al. A CDMA Based Bidirectional Communication System for Hybrid Fiber–Coax CATV Networks, IEEE, pp. 127–135, Jun. 1997.*

* cited by examiner

Primary Examiner—Glenton B. Burgess
Assistant Examiner—Hien C. Le
(74) Attorney, Agent, or Firm—Scully, Scott, Murphy & Presser; Douglas W. Cameron, Esq.

(57) ABSTRACT

Dynamically adjustable hybrid two-way data networks are described which provide a high degree of connectivity. In one embodiment, a two-way CaTV system uses the CaTV plant most of the time, but also uses the public switched telephone network (PSTN) as a back-up whenever upstream or downstream connectivity between a cable modem and the CaTV head end (H/E) is severed. Management elements are provided for a fully operational two-way CaTV network which uses PSTN connections as an "on-the-fly" back-up mechanism for rare occasions when the CaTV plant looses its upstream and/or downstream connectivity. On the end-user side, a hybrid two-way CaTV/PSTN network provides added intelligence in either the cable-modem box, which may be enhanced with a regular voice-grade modem, or in the PC attached to the cable modem, to automatically handle both communications media. Similarly, on the H/E side, added capabilities are provided for processing and managing both CaTV and PSTN connections as well as managing the transitions from one medium to the other and vice versa.

7 Claims, 3 Drawing Sheets

DYNAMICALLY ADJUSTABLE HYBRID TWO-WAY DATA NETWORKS

BACKGROUND OF THE INVENTION

1. Technical Field

The present invention relates generally to dynamically adjustable hybrid two-way data networks, and more particularly pertains to dynamically adjustable hybrid two-way data networks.

The majority of residential customers can use 33.6 Kbps (and possibly 56 Kbps) dial-up telephone connections to on-line services. The popularity of the web has increased substantially the number of people served by on-line service providers, but the slow speeds associated with surfing the web and downloading information from it via telephone modems quite often make this experience a painful one. True interactive broadband services is out of the reach of the majority of small office/home office (SOHO) and general residential customers.

The development of cable modem technologies for hybrid fiber/coaxial (HFC) CaTV networks promises the advent of multi-Mbps interactive broadband services to residential customers. The exploitation of the large excess bandwidth on an HFC CaTV plant would permit customers to cruise the web and enjoy other interactive services at speeds that are 100-fold or more than what is possible today.

While two-way communications over the telephone network has been maturing for more than a century now, two-way communication networks based upon the CaTV infrastructure is still in its infancy. Considerable effort is required for developing not only the data transport mechanisms needed for transporting data back and forth over the shared-medium CaTV plant, but also the network management protocols which will guarantee high-availability of the CaTV plant for practically uninterrupted digital services to customers.

Due to the tree-and-branch topology of a CaTV network, there is no possibility of "re-routing" transmissions around a cut in the cable network. Hence, a single cut of the cable could throw a whole community of customers out of service for a long period of time. Even worse, the frequency spectrum from 5 to 42 MHZ which will be used for upstream transmissions, i.e., from the cable modem to the CaTV headend (H/E), is prone to ingress noise interference from unterminated CaTV outlets, ham radio, short-wave radio, impulse noise, etc. All of this noise is further amplified as it travels to the H/E due to the noise funneling effect.

2. Prior Art

Currently available static CaTV/PSTN (Public Switched Telephone Network) systems use PSTN for upstream transmissions, and the CaTV plant for downstream transmissions. The use of static hybrid networks with CaTV on the downstream side and PSTN on the upstream side has been introduced during the last few years to provide a fast entry to the interactive CaTV arena, with "off-the-shelf" solutions which do not require a fully two-way operational CaTV system.

U.S. Pat. No. 5,586,121 discloses static hybrid networks where the use of the same or a different communications channel is suggested for the forward and return channels. Also, U.S. Pat. No. 5,534,913 discloses an apparatus and method for integrating downstream data transfer over a cable television channel with upstream data carrier by other media. U.S. Pat. No. 5,488,412 teaches a customer premises equipment which receives high-speed downstream data over a cable television system and transmits lower speed upstream signaling on a separate channel.

SUMMARY OF THE INVENTION

It is a primary object of the present invention to provide dynamically adjustable hybrid two-way data networks.

The present invention maintains a high degree of connectivity by providing a two-way CaTV system which uses the CaTV plant most of the time, but also uses the public switched telephone network (PSTN) as a back-up whenever upstream or downstream connectivity between a cable modem and the CaTV H/E is severed.

The present invention provides management elements for a fully operational two-way (HFC) CaTV network which uses PSTN connections as an "on-the-fly" back-up mechanism for the rare occasions that the CaTV plant looses its upstream and/or downstream connectivity. On the end-user side, a hybrid two-way CaTV/PSTN network (2w-hCPN) requires added intelligence in either the cable-modem box, which may be enhanced with a regular voice-grade modem, or in the PC attached to the cable modem, to automatically handle both communications media. Similarly, on the H/E side, a 2w-hCPN requires added capabilities for processing and managing both CaTV and PSTN connections as well as managing the transitions from one medium to the other and vice versa.

The present invention is not restricted to CaTV/PSTN dynamic networks only. Different types of hybrid networks, currently existing or developed in the future, can be utilized by the subject invention. For example, the present invention can use networks which use radio frequency (RF) for downstream transmissions and PSTN for upstream transmissions, or even hybrid networks which comprise more than just two different communications media. For these other hybrid networks, the subscriber and H/E equipment modem only needs to be replaced appropriately. Without excluding these other hybrid networks, a preferred embodiment of the invention focuses on 2w-hCPNs.

BRIEF DESCRIPTION OF THE DRAWINGS

The foregoing objects and advantages of the present invention for a dynamically adjustable hybrid two-way data networks may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
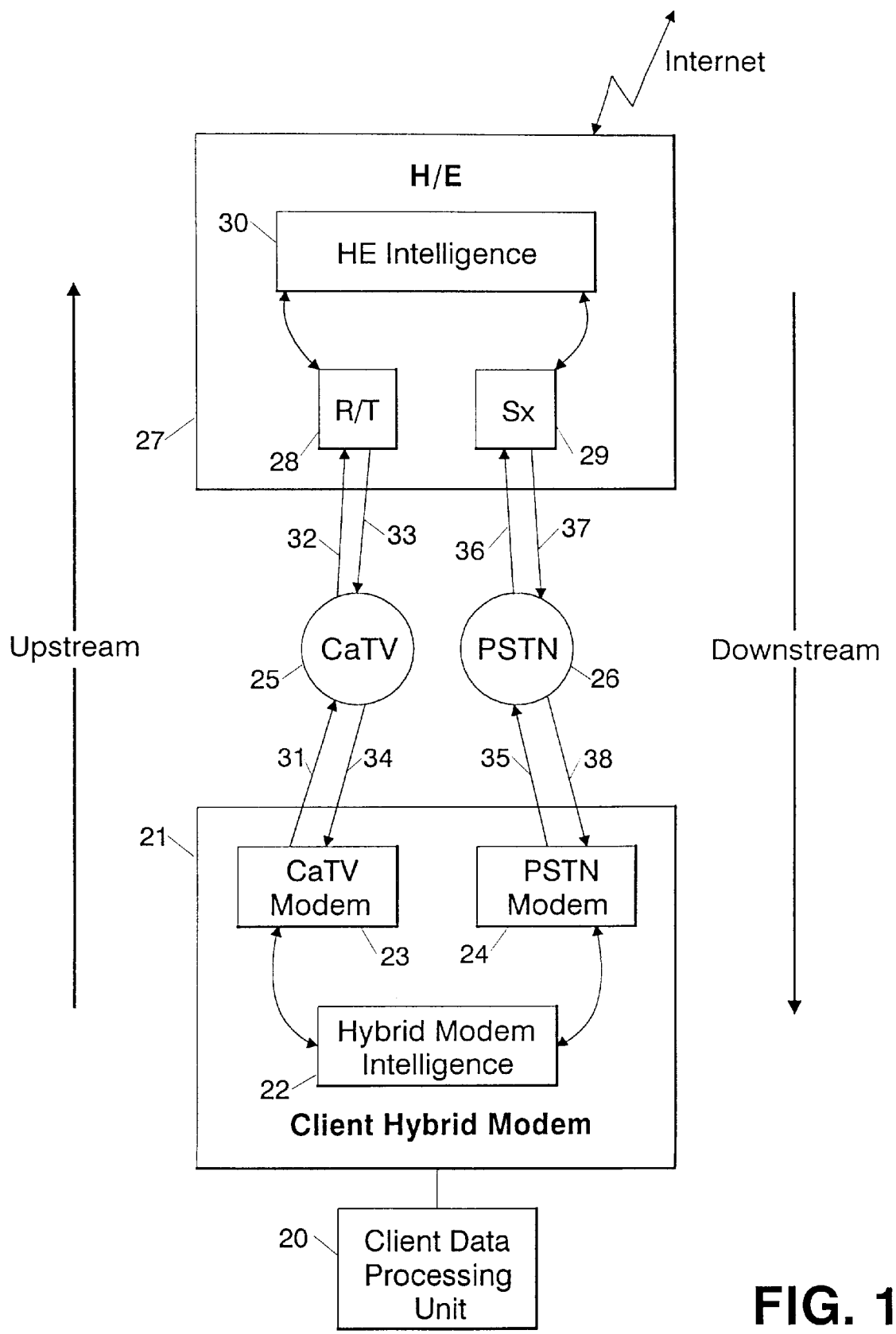
FIG. 1 depicts a client data processing unit, e.g., a PC at a subscriber's home or office, attached to a 2w-hCPN via a client hybrid modem unit.

Referring to the drawings in detail, FIG. 1 depicts a client data processing unit 20, e.g., a PC at a subscriber's home or office, attached to a 2w-hCPN 25 and 26 via a client hybrid modem unit 21. The client modem unit includes a CaTV modem 23, PSTN modem 24, and modem intelligence software and hardware 22 that chooses which medium the client data processing unit uses for its upstream and downstream communications. The modem unit is a logical construct since, as mentioned hereinabove in the background discussion, a physical client modem box may contain only the CaTV modem, while the PSTN modem may be internally located in the end-user PC or be attached externally to it. The following discussion, whenever needed, refers explicitly to CaTV or PSTN modems. If no such need exists, the logical box containing both modems is referred to as the client.

During regular network operation, the client 21 uses only its CaTV modem 23 and the CaTV portion of the hybrid network 25 to communicate with the CaTV H/E 27, which is attached to the network with a (number of) receivers and transmitters 28. If a severe situation arises in the CaTV portion of the network, e.g., a cable cut, damage in a CaTV two-way amplifier, excessive noise interference, CaTV modem failure, etc, the client activates the PSTN modem 24 and PSTN portion 26 of the hybrid network to replace appropriately the upstream 35 and 36 and/or the downstream 37 and 38 communication paths between the client and the H/E. In FIG. 1 the links 31 through 38 merely represent upstream and downstream physical connections between the CaTV or PSTN networks, the client hybrid modem, and the CaTV H/E.

Current residential networks which use either PSTN connections exclusively, e.g. network 26 and links 35 through 38 only, or PSTN in the upstream direction, e.g. network 26 and links 35 and 36, are special "static" cases of the 2w-hCPN. Similarly, systems which have been designed only to receive digital broadcast signals, e.g. only the CaTV downstream direction 33, 25 and 34 are active, are also a special degenerate case of the hybrid 2w-hCPN.

Based upon the communication systems currently in use by the client, corresponding modes of client operation (MOP) are defined. Note that a MOP is associated with each client attached to the 2w-hCPN, and different clients may have different MOPs.

TABLE 1

The modes of operation (MOP) for a 2w-hCPN

| MOP | upstream | downstream | PEN |
|---|---|---|---|
| 1 | CaTV | CaTV | X |
| 2 | PSTN | CaTV | |
| 3 | PSTN | PSTN | X |

The MOPs to be considered are summarized in Table 1. Table 1 also designates MOPs (1) and (3) as points of entry (PENs) which newly powered/rebooted clients use to initialize themselves, without excluding the possibility that one may also designate MOP (2) as a point-of-entry.

For completeness, in Table 1 one could also consider the case where CaTV is used on the upstream and PSTN on the downstream. Although, this may indeed be a viable MOP, it will not be considered here since:

it clearly violates the communications asymmetry expected from residential communication environments where the heaviest traffic is on the downstream side;

severance of the more reliable downstream CaTV path probably implies that the more vulnerable upstream CaTV path is also non-operational; and efficient (HFC) CaTV network management and operation require that upstream CaTV transmissions be under the control of the H/E, which supplies its control information on the CaTV downstream. Although, one could also place upstream control information on the PSTN downstream, this would complicate the management of the system to such a high degree that it would render the system impractical.

Thus, for this embodiment, it will be assumed that as soon as the downstream CaTV medium becomes non-operational, so does the upstream as well, in which case PSTN will be used for both upstream and downstream transmissions.

Each MOP has its own network operational characteristics, e.g., a PSTN connection occupies a well defined physical port on a telephone switch at the H/E and connects the H/E with only one PSTN modem, via a PSTN point-to-point physical connection. On the other hand, on the shared medium CaTV network all connections are virtual and each CaTV modem is identified by a unique CaTV modem address, denoted as CM_ADDR. The CM_ADDR could be a universally or locally administered address. Without lack of generality, it will be assumed that CM_ADDR is a temporary, locally administered short address provided to the CaTV modem by the H/E during the initialization of the corresponding client. This locally administered address remains valid for as long as needed, or until the modem powers down.

Next, possible transitions are presented between the various MOPs in a 2w-hCPN.

The MOPS, the PENs and their management

Figure 2:
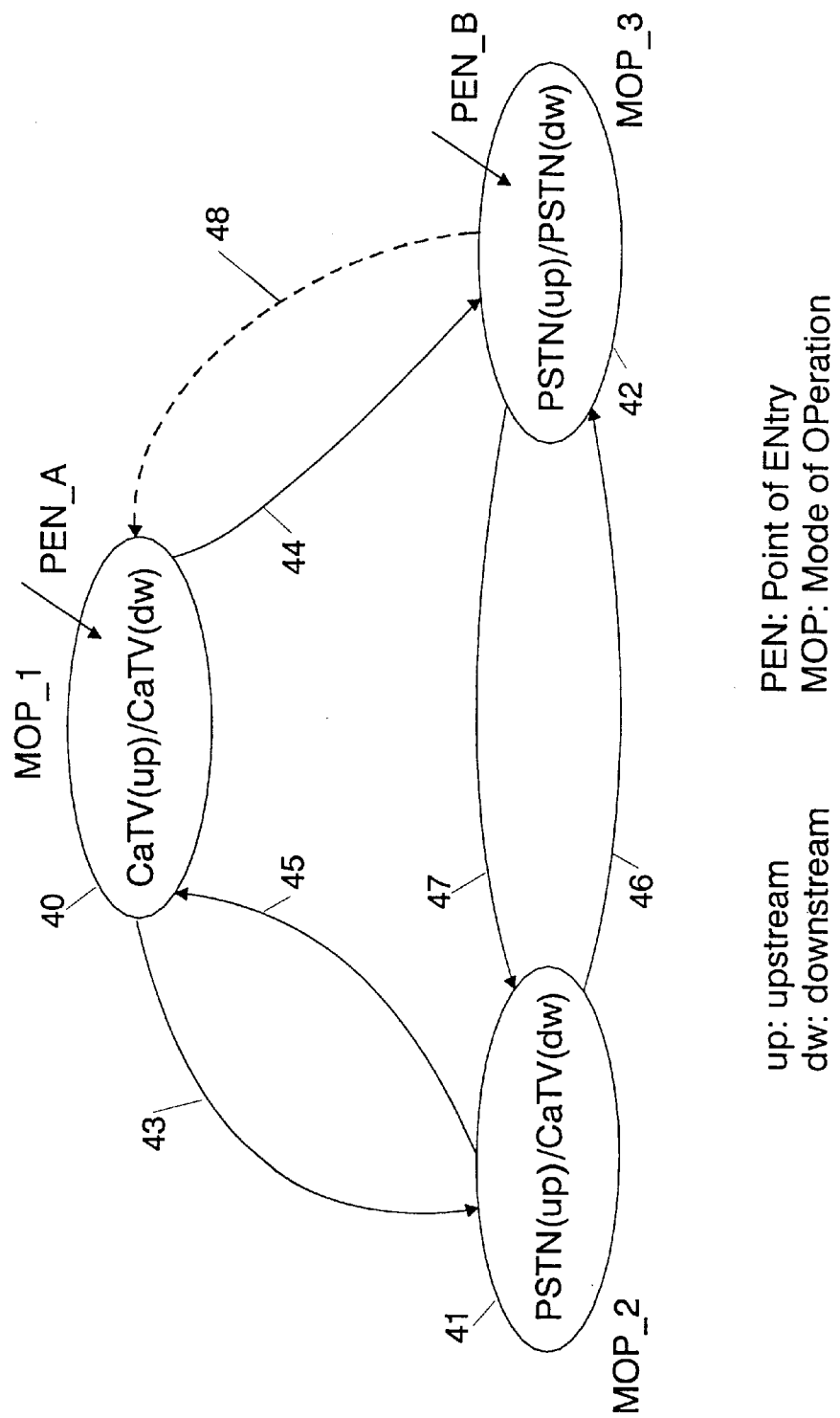
FIG. 2 is a MOP (mode of communications operation) transition diagram which shows possible transitions between the various MOPs during operation of a 2w-hCPN.

FIG. 2 is a MOP transition diagram which shows possible transitions between the various MOPs during operation of a 2w-hCPN. The MOPs are depicted with ovals 40, 41 and 42, each of which contains the medium used for upstream and downstream transmissions. Possible transitions between MOPs are shown with the directed links 43 through 48.

Clearly, MOP transition management algorithms should be utilized to guarantee a smooth operation of the network, the client, and finally the end-user. These management algorithms could be incorporated in the intelligence modules of the hybrid cable modem 22 and the H/E 30 in FIG. 1.

TABLE 2

The mapping table
A mapping table of addresses and ports at the H/E

| UNIV_ADDR | NET_ADDR | MOP | CaTV port / CM_ADDR | PSTN port |
|---|---|---|---|---|

To properly manage a 2w-hCPN, the H/E maintains a mapping table in its intelligence module 30, each row of which is of the form shown in Table 2. This Table could be maintained as a "stand-alone" by the H/E. Most probably, though, the Table would be only a part of a more general management database maintained by the H/E.

The universal (client) address, denoted as UNIV_ADDR, ubiquitously identifies the client and can be used when no other local address has been assigned to the client yet, e.g., during client initialization. The universal address could be a 48-bit IEEE address assigned to a CaTV modem during its manufacture, or the telephone number from which a client calls the H/E, etc.

The NET_ADDR is a temporary network address assigned to a client by the H/E for communicating with the "outside world". For example, if the H/E is connected to the Internet and the client needs to communicate with other clients and nodes using Internet protocols, the NET_ADDR could be an IP (or similar network) address dynamically, yet exclusively, assigned to newly powered clients by the H/E, or by the Internet service provider (ISP) which the H/E is connected to. If multicasting is permitted, multiple temporary group NET_ADDR addresses may be entered here.

Note that usually a NET_ADDR is assigned to an end-user itself, see FIG. 1, rather than a client. This point is very important especially when a single client is connected to multiple end-users at the customer's premises. In this case, the NET_ADDR entry in the mapping table is considered to be a pointer to NET_ADDR structure. As such, one may consider NET_ADDR to belong logically to a more general network operations database maintained by the H/E rather than the mapping table itself.

The H/E also marks in its mapping table the MOP currently used by the client; this information is provided by the client. This entry is particularly useful for distinguishing between MOPs (2) and (3), where the modem may be listening for H/E transmissions on different downstream media. This is not important for upstream transmissions, since by default, the H/E is always listening to the CaTV upstream.

Based upon the MOP, additional information pertaining to the identity of the client and routing data to it, is entered in the mapping table.

If CaTV is used for at least the downstream transmissions, a client must be assigned a unique CM_ADDR for communications internal to the CaTV networks between the H/E and the client. If a client is listening on a CaTV downstream, the CaTV port entry contains (or points to) information regarding the downstream fiber (for HFC networks), the downstream frequency, etc, which the client has been assigned to. This entry could be a pointer to a data structure which contains a lot more information regarding a client, e.g., identify the upstream channel that the client transmits in; the CD_ADDR itself may be a member of this data structure. It should be emphasized that while a NET_ADDR is used for end-to-end communications between end users, a CM_ADDR is used for communications exclusively between the H/E and the CaTV modem.

If a client is using a PSTN connection, for either downstream and/or upstream transmissions, the PSTN port contains the PSTN switch port number that the PSTN connection to the client has been assigned to at the H/E site. This entry could be a pointer to a data structure which contains a lot more information regarding a client.

Client modems initialization/reactivation

In order for a CaTV modem to operate properly without interfering with other CaTV modem's efforts to receive and transmit information from and to the CaTV network, respectively, the CaTV cable modem needs to:

be assigned a CM_ADDR so it can receive (resp. send) information to (resp. from) the H/E;
 be assigned upstream and a downstream frequency bands, i.e., channels, on which it can receive and send information;
 derive necessary timing information so that when it attempts to transmit it does not overlap unnecessarily with other CaTV modem transmissions; and
 be assigned transmitter power level and other CaTV modem management parameters.

Hence, unlike the simple, yet low speed of a PSTN connection, where a simple point-to-point link between H/E and a PSTN modem is established, a CaTV modem needs "sufficient training" prior to starting using the CaTV network.

While downstream CaTV transmissions are in a stream-like continuous form, which simplifies the synchronization and reception of downstream CaTV transmissions, upstream CaTV transmissions are not as simple. The CaTV modem in a client needs to undergo initialization every time the client uses a PSTN upstream and it needs to restore its CaTV upstream connection.

During this initialization, the H/E may reassign the same CM_ADDR, if one has already been given to the client, or provide a new one. The assignment of CM_ADDR is left to the operator as an option. Yet, without lack of generality, it is assumed that if a client has already been assigned a CM_ADDR, then the same CM_ADDR is reassigned to it until the client powers down, or a fatal system failure (e.g., power failure, etc.) occurs.

Following initialization, the H/E fills the appropriate entries of the mapping table row identified by the universal client address. If the client initializes in MOP_1 then a local CM_ADDR and a "remote" NET_ADDR address from corresponding pools of available addresses are provided to the client and the H/E marks where the client's CaTV modem is located, e.g., on which fiber it is attached to and at which frequency it listens, etc, by identifying a CaTV port for it. On the other hand, if the client initializes at MOP_3, the H/E marks on which PSTN switch port the client's PSTN modem is connected to, and it also assigns a temporary NET_ADDR address, e.g., an Internet IP address. Note that a CM_ADDR can also be assigned at this point (but not a CaTV port), but this is left to the operator as an option.

Next are presented the possible actions taken by a 2w-hCPN client as the modes of network operation change. These actions are taken according to a management algorithm executed by a processor located in the intelligence module of the modem 22.

PEN and the MOP transitions

For this subsection, assume that the client is equipped with a two-way capable CaTV modem, and that it is connected to a CaTV network capable of two-way communications. If any of these conditions do not apply, a corresponding MOP transition is considered as invalid.

The management of a 2w-hCPN consists of keeping track of which clients operate with which MOP and how to switch transparently between MOPs to achieve the best performance possible.

When a new client just powers-up, it listens at the CaTV downstream for a valid signal and a "welcome newcomers!" message from the H/E. There are two possibilities:

1. The client acquires a valid downstream CaTV signal and a welcome message.
 2. The client fails to acquire any legitimate signal on the downstream.

In the first case, the H/E, using a broadcast address for newcomers, assigns the client a CaTV upstream channel. Using its universal address, the client can transmit on the specified CaTV upstream channel. Again there are two possibilities:

1. The H/E listens to the new client's transmission and assigns to it a local CaTV address (CM_ADDR). The client receives its new address assignment on a CaTV downstream channel, e.g., the channel on which it first listens to the welcome message, or on downstream channel assigned to the client by the H/E.

2. The modem fails to retrieve any information from the H/E.

Figure 3:
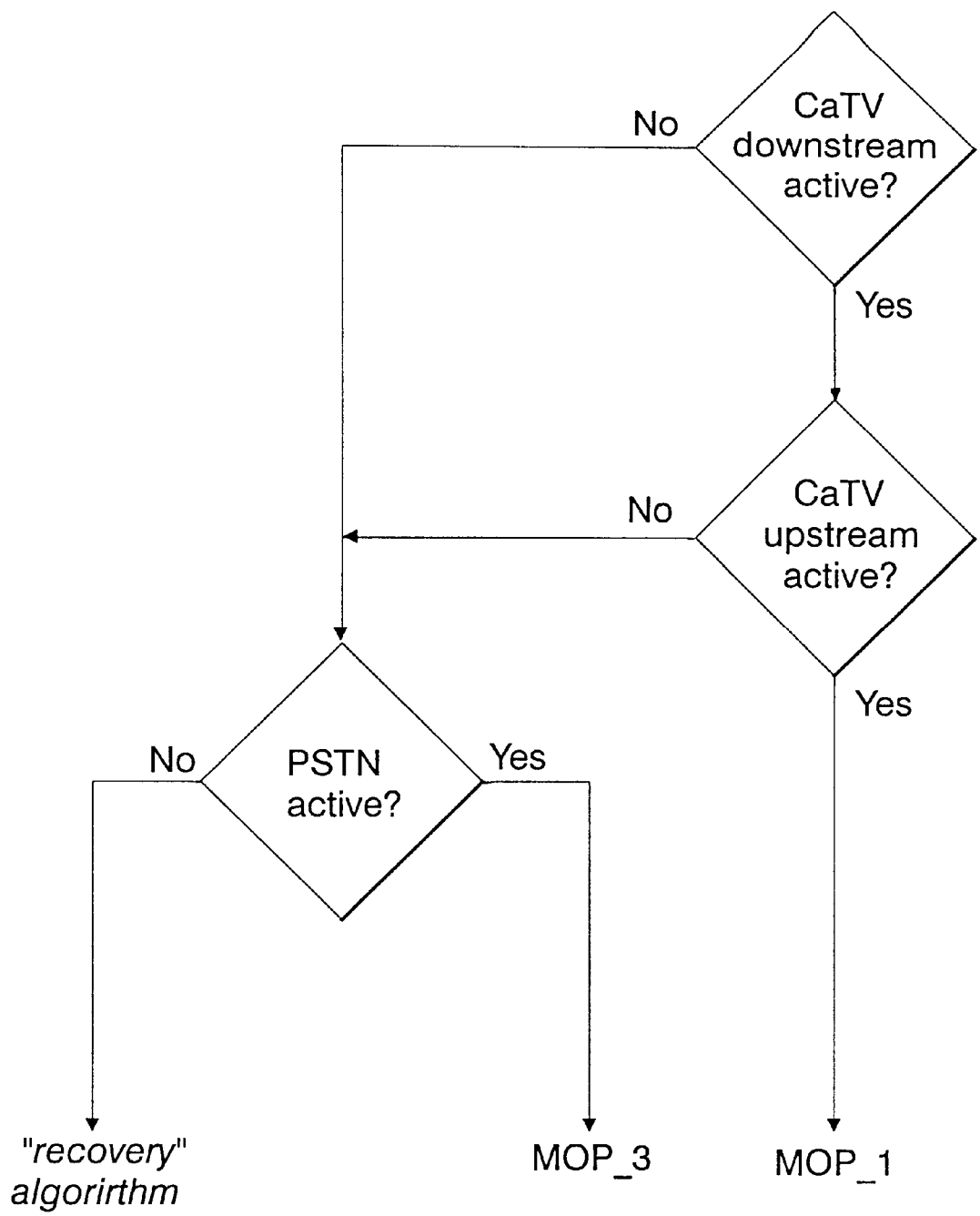
FIG. 3 is an initial MOP decision chart which summarizes the MOP decisions during initialization of a client.

In the first case, the client connects to the 2w-hCPN at the default MOP_1, see PEN_A in FIG. 2. In the latter case, as well as when the client fails to acquire any downstream CaTV signal, the client fails to connect to the H/E via the CaTV network. In this case, the client establishes a PSTN connection to the H/E and it connects to the 2w-hCPN at MOP_3, see PEN_B in FIG. 2. FIG. 3 is an initial MOP decision chart which summarizes the MOP decisions during initialization of a client. For completeness, the case has been added that neither the CaTV nor the PSTN network is available, in which case, a "recovery" algorithm is activated, e.g., automatically repeat the initialization process, prompt for user input, etc. If communication is interrupted on all available communications media, while the system is in operation, i.e., after initialization, then the state diagram in FIG. 2 should be enhanced with a transition to a "recovery" state. Although the total severance of communications is a very important situation, this case will not be elaborated upon further in this discussion.

In the sequel, it is assumed that two-way communications is possible over at least one upstream and one downstream path combination of the available communications media.

While in MOP_1, the client continues operating in the default mode. While in any other MOP, the client continuously (or regularly) attempts to move toward MOP_1. This implies that whenever the PSTN is used on the upstream and/or downstream side, the client will probe the upstream and downstream CaTV channels, as if it were a newcomer, waiting for a response from the H/E.

It appears that if a client has established a PSTN connection with the H/E, it may be able to bypass some of the initialization procedures associated with just powered-up clients. This is not true though and the client always needs to act as a newcomer on the CaTV network. Recall that in order not to interfere with regular CaTV transmissions, as soon as a CaTV modem loses timing information (especially for the upstream direction), the modem needs to acquire timing (and other information) for its CaTV transmissions, which requires practically a reinitialization of a client's CaTV modem.

MOP transition: 1→2 (43)

Suppose that a client currently operates in MOP_1. If after a time-out period ($T_{12}$) the client recognizes that, although it can listen to the H/E, the H/E does not respond any more to the requests from the client, the client activates its PSTN upstream by "dialing-up" the H/E. As soon as a PSTN connection is established between the client and the H/E, the client provides the H/E its UNIV_ADDR and possibly other addresses like the NET_ADDR and CM_ADDR. Since the client can still listen on the CaTV downstream, using its already established CM_ADDR, it also informs the H/E with that it is currently operating in MOP_2. In the meantime, the H/E makes a note of the PSTN port that the client is attached to.

The H/E is now ready to update the client's entry in its mapping table, see Table 2, with the new information regarding the client, primarily the MOP and the PSTN port. The H/E and the client have now established a MOP_2 type of communication.

MOP transition: 1→3 (44)

Suppose that a client currently operates in MOP_1. As soon as the client recognizes that it has lost connection with the CaTV downstream, or after a time-out period ($T_{13}$), the client activates its PSTN upstream by "dialing-up" the H/E. As soon as a PSTN connection is established between the client and the H/E, the client provides the H/E its UNIV_ADDR and possibly other addresses like the NET_ADDR and CM_ADDR. Since the client can no longer listen on the CaTV downstream, it also informs the H/E with that it is currently operating in MOP_3. In the meantime, the H/E makes a note of the PSTN port that the client is attached to.

The H/E is now ready to update the client's entry in its mapping table, see Table 2, with the new information regarding the client, primarily the MOP and the PSTN port. The H/E and the client have now established a MOP_3 type of communication.

MOP transition: 2→1 (45)

Suppose that a client currently operates in MOP_2. The client will regularly try to upgrade itself to MOP_1. To do this, the client tests the CaTV upstream until the H/E responds to the client that it has listened to its transmission on the CaTV upstream; note that the client can still communicate regularly with the H/E via its PSTN connection.

Since transmissions on the CaTV upstream are assumed to be always under the control of the H/E, a client cannot freely probe/transmit in the CaTV upstream. So in this case, the client behaves like a just powered-on client attempting to enter the 2w-hCPN at PEN_A. When this effort eventually succeeds, the client provides its UNIV_ADDR to the H/E, which recognizes that this client already has an entry in the H/E mapping table. The H/E may assign a new CM_ADDR, or reassign the same one. Finally, the H/E updates its mapping table appropriately, and the H/E can now communicate in MOP_1. The client, and then the H/E, can now place their PSTN connection on-hook and continue their communication in MOP_1. The H/E must clear the entries associated with the PSTN port for this client.

MOP transition: 2→3 (46)

Suppose that the client currently operates in MOP_2. As soon as the client recognizes that it has lost connection with the CaTV downstream, or after a time-out period ($T_{23}$), the client activates its PSTN upstream by "dialing-up" the H/E. As soon as a PSTN connection is established between the client and H/E, the client provides the H/E its UNIV_ADDR, and possibly other addresses. Since the client can no longer listen on the CaTV downstream, it also informs the H/E that it is currently operating in MOP_3. In the meantime, the H/E makes a note of the PSTN port that the client is attached to.

The H/E is now ready to update the client's entry on its mapping table, see Table 2, with the new information regarding the client, primarily the MOP; note that the PSTN port has already been assigned to the client. The H/E and the client have now established a MOP_3 type of communication.

MOP transition: 3→2 (47)

Suppose that the client currently operates in MOP_3. The client continuously monitors the CaTV downstream in hope of receiving a legible signal. If this happens, the client communicates to the H/E via the PSTN upstream so that it can now listen on the CaTV downstream, i.e., MOP_2; the client also provides the frequency channel that is currently listening to. Note that if the client uses the telephone number as its UNIV_ADDR, e.g., when the client initializes at PEN_B, the client also provide its CaTV modem's 48-bit address as a substitute for the UNIV_ADDR.

Using the PSTN downstream, the H/E assigns, if it has not done so yet, a CM_ADDR to the client so that it can send information to the client using the CaTV downstream. Also, a new downstream channel may be assigned to the client. The H/E and the client have now established a MOP_2 type of communication.

MOP transition: 3→1 (48)

This transition may not always be active and may be replaced by the MOP transitions 3→2→1. One can explicitly consider a 3→1 transition, when the CaTV upstream and downstream become alive simultaneously and the CaTV modem in a client starts to operate like a just powered-on client. This situation can also arise when one may have initially powered only the PSTN modem and then one also powers the CaTV modem as well, while the CaTV network is perfectly healthy.

While several embodiments and variations of the present invention for dynamically adjustable hybrid two-way data networks are described in detail herein, it should be apparent that the disclosure and teachings of the present invention will suggest many alternative designs to those skilled in the art.

It is a primary object of the present invention to provide dynamically adjustable hybrid two-way data networks.

The present invention maintains a high degree of connectivity by providing a two-way CaTV system which uses the CaTV plant most of the time, but also uses the public switched telephone network (PSTN) as a back-up whenever upstream or downstream connectivity between a cable modem and the CaTV H/E is severed.

The present invention provides management elements for a fully operational two-way (HFC) CaTV network which uses PSTN connections as an "on-the-fly" back-up mechanism for the rare occasions that the CaTV plant looses its upstream and/or downstream connectivity. On the end-user side, a hybrid two-way CaTV/PSTN network (2w-hCPN) requires added intelligence in either the cable-modem box, which may be enhanced with a regular voice-grade modem, or in the PC attached to the cable modem, to automatically handle both communications media. Similarly, on the H/E side, a 2w-hCPN requires added capabilities for processing and managing both CaTV and PSTN connections as well as managing the transitions from one medium to the other and vice versa.

Having thus described our invention, what we claim as new, and desire to secure by Letters Patent is:

1. A computer communications system wherein a client terminal equipment communicates with a server equipment over plurality of different communications media, comprising:
   a. a client terminal modem for establishing communications with the server equipment over a plurality of communications media in a first direction, and also over a plurality of communications media in a second opposite direction; and
   b. a server equipment modem for establishing communications with the client terminal equipment over a plurality of communications media in the first direction, and also over a plurality of communications media in the second opposite direction;
   each possible pair of the plurality of communications media in the first and the second directions defining a different mode of communications operation, wherein responsive to a connectivity failure of a first communications media established for communication in the first direction according to a first mode, said client terminal modem dynamically activating a second mode of communications operation by establishing communications with said server equipment over a second communications media different from said first communications media in said first direction while maintaining communications on the communications media in the second direction.

2. A computer communications system as claimed in claim 1, wherein each modem can operate over at least two possible different modes of communications operation.

3. A computer communications system as claimed in claim 1, further including a controller at each modem for controlling a change of the mode of communications operation between the plurality of communications media in each of the first and second directions.

4. A computer communications system as claimed in claim 1, wherein the server equipment stores management information to support communications over different modes of communications operation in each of the first and second directions.

5. A computer communications system as claimed in claim 1, wherein each modem includes modem/server protocols to support communications over different modes of communications operation in each of the first and second directions.

6. A computer communications system as claimed in claim 1, wherein the plurality of communications media include a cable television network and a public switched telephone network.

7. A computer communications system as claimed in claim 6, wherein the cable television network is used as a primary communications media, and the public switched telephone network is used as a back-up media upon a failure in the cable television network.

* * * * *